May 8, 1928.
E. A. DUDLEY
1,668,891
SLIP-IN PUMP VALVE
Filed June 16, 1927
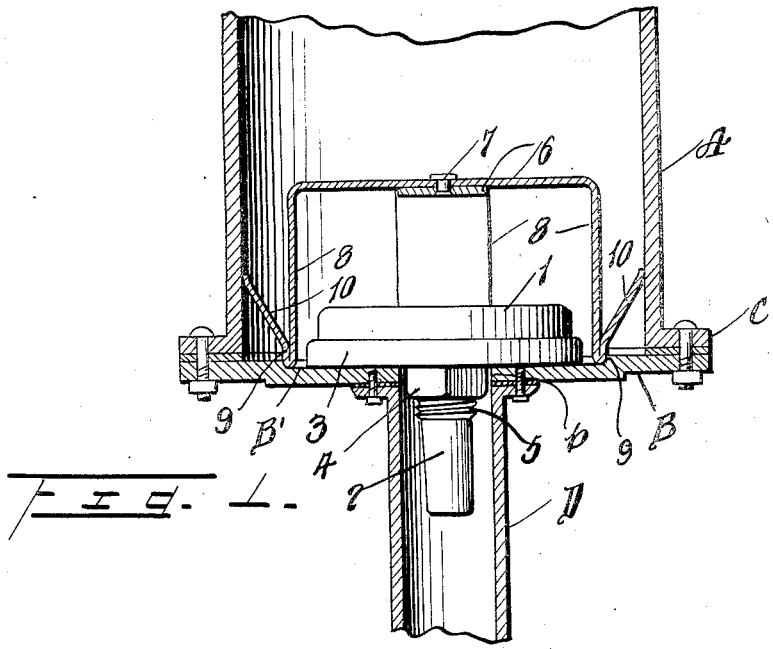
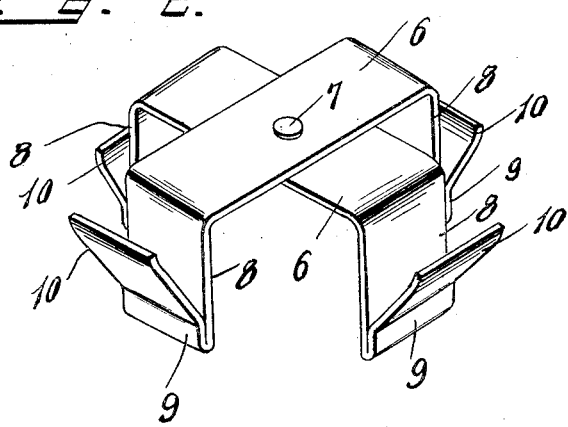
Inventor
E. A. Dudley.
By
Attorney Patented May 8, 1928.

1,668,891

UNITED STATES PATENT OFFICE.

EMMET A. DUDLEY, OF SALEMBURG, NORTH CAROLINA.

SLIP-IN PUMP VALVE.

Application filed June 16, 1927. Serial No. 199,300.

The invention relates to the foot valves for pumps, and has for its object the provision of a valve structure that is adapted to be quickly installed and displaced from a pump cylinder, and that is reasonable in cost of manufacture and effective in operation.

A further object of the invention is the provision of a pump valve structure comprising a disk with a downwardly extending stem to engage in an opening in the base of the cylinder and in the upper portion of the pipe secured to the base, and a cage forming a guide for the valve comprising crossed U-shaped members that seat on the base of the pump cylinder and having outwardly deflected tongues to engage the inner wall of the pump cylinder to hold the cage in place.

The invention will be described in detail hereinafter and will be found illustrated in the accompanying drawing, in which Figure 1 is a central vertical sectional view of a conventional pump cylinder and pipe connected thereto, shown fragmentally, showing also the valve in elevation and the cage in section, and Figure 2 is a view in perspective of the cage.

Referring to the drawings, in which similar reference characters will be used to designate corresponding parts in both of the views, a pump cylinder is indicated conventionally at A having a base B secured to a flange C on the lower end of the cylinder and provided with an opening $b$ that communicates with the pump pipe D secured to said base B. The valve comprises a disk 1 having a stem 2 that extends through the opening $b$ and into the pipe D, and is provided with a washer or gasket 3 that is held in place by means of a nut 4 engaging threads 5 on the stem 2. The cage comprises crossed members of flat bars of steel designated 6 that are riveted together as shown at 7, or otherwise secured. Said strips 6 are formed into inverted U-shaped members by downwardly extended portions 8 that are returned as shown at 9 to form feet to rest upon the base B, said base being preferably provided with a circular recess B' to form a seat for the valve 1 and a rest for the returned portions 9. The extremities of the strips 6 are deflected outwardly and upwardly as shown at 10 to engage the inner face of the wall of the cylinder A to hold the cage properly positioned therein.

It will be understood that the function of the cage is to prevent the valve disk 1 being raised such a height that the stem 2 will leave the opening $b$ and thus endanger reseating the valve in its proper position. It will also be understood that the cage and valve may be readily installed and displaced for repair of the valve.

What is claim is:—

1. A valve cage for pumps, comprising crossed inverted U-shaped members, the terminals of the members being adapted to seat on the base of a pump cylinder, and upwardly and outwardly deflected tongues on the legs of said members to engage the inner wall of the pump cylinder.

2. A valve cage for pumps, comprising crossed inverted U-shaped members, the terminals of said members being returned outwardly thereof forming feet to seat on the base of a pump cylinder, and the extremities of said members being deflected upwardly and outwardly forming tongues to engage the inner wall of the pump cylinder.

3. A valve and cage for pumps, a cage consisting of crossed inverted U-shaped members adapted to seat on the base of a pump cylinder, upwardly and outwardly deflected tongues on the legs of said members to engage the inner wall of the pump cylinder, and a valve comprising a disk to seat on said base, and a guide stem extending downwardly from said disk and adapted to engage in an opening in the base and in a pipe secured thereto.

In testimony whereof I affix my signature.

EMMET A. DUDLEY.